United States Patent
Tagawa et al.

(10) Patent No.: US 6,473,382 B1
(45) Date of Patent: Oct. 29, 2002

(54) OPTICAL DISK DEVICE WITH SLIDABLE HOLDING MEMBERS ON DISK TRAY FOR HOLDING DISKS OF DIFFERENT DIAMETERS

(75) Inventors: Kazusato Tagawa, Chiba pref; Shigehisa Miyasaka, Tokyo, both of (JP)

(73) Assignee: Sony Computer Entertainment Inc., Tokyo (JP)

( * ) Notice: Subject to any disclaimer, the term of this patent is extended or adjusted under 35 U.S.C. 154(b) by 138 days.

(21) Appl. No.: 09/642,323

(22) Filed: Aug. 21, 2000

(30) Foreign Application Priority Data

Aug. 27, 1999 (JP) .......................................... 11-241881

(51) Int. Cl.⁷ ............................................ G11B 33/02
(52) U.S. Cl. .................................................... 369/77.1
(58) Field of Search ................................ 369/75.2, 77.1

(56) References Cited

U.S. PATENT DOCUMENTS

| | | | |
|---|---|---|---|
| 5,930,218 A | | 7/1999 | Mitsui et al. |
| 6,052,352 A | * | 4/2000 | Liou .......................... 369/75.1 |
| 6,122,240 A | * | 9/2000 | Kim ........................... 369/77.1 |
| 2002/0034146 A1 | * | 3/2002 | Morinaga .................. 369/75.2 |

FOREIGN PATENT DOCUMENTS

| | | |
|---|---|---|
| EP | 0 366 452 | 5/1990 |
| EP | 0 729 146 | 8/1996 |
| JP | 6-251479 | 9/1994 |
| JP | 7-153163 | 6/1995 |
| JP | 8-45153 | 2/1996 |
| JP | 8-45154 | 2/1996 |

OTHER PUBLICATIONS

Koshino et al. US PGP 2001/0017835 A1. Aug. 2001.*

* cited by examiner

*Primary Examiner*—Robert S. Tupper
*Assistant Examiner*—Julie Anne Watko
(74) *Attorney, Agent, or Firm*—Katten Muchin Zavis Rosenman (57) ABSTRACT

It is an object of the present invention to provide a disk device that can use disks of different diameter sizes and can be used in a vertical orientation. A disk tray (31) that makes up the disk drive has holding members (37) which hold a disk inserted in depressions (32, 33) from outside its surface. The holding members (37) are construed so as to be able to move along guide grooves (35, 36). By moving holding members (37) to fit the diameter size of the disk that is to be inserted in the depressions (32, 33) the lower part of the disk can be held by the holding members (37) even if the disk device is used in vertical orientation.

18 Claims, 7 Drawing Sheets

OPTICAL DISK DEVICE WITH SLIDABLE HOLDING MEMBERS ON DISK TRAY FOR HOLDING DISKS OF DIFFERENT DIAMETERS

FIELD OF THE INVENTION

This present invention relates to a disk device that has a disk tray which has depressions into which a disk for recording and/or for playback is inserted and which loads that disk onto the device main body. For example, the disk device can be used as the disk device of a CD, DVD, or other optical disk player or of a CD-ROM, DVD-ROM, or other optical disk drive, etc.

BACKGROUND OF THE INVENTION

Long known as disk devices for CD, DVD, and other optical disk drives, etc. are disk devices into which an optical disk, that is an information storage medium, is loaded by inserting it in a depression on a disk tray placed approximately horizontally, and accommodating the disk tray inside the main body of the device.

With such a disk device, it suffices merely to place the optical disk in the disk tray, making it possible to simply load the disk onto the main body of the device and to accommodate with a single disk device various optical disks of different diameter sizes such as 8 cm, 12 cm and so on. Thus, one disk drive can read and reproduce various optical disks having different diameter sizes.

The aforesaid disk device, besides being used in the horizontal orientation in which the disk tray is horizontal, is also sometimes used in vertical orientation in which the disk tray is vertical.

If the disk device is used oriented vertically, it is not possible, just by inserting an optical disk into the depression, to hold the optical disk on the disk tray. Therefore, as disclosed in the Japanese patent application Laid-Open No. 6-251479, 1994, a disk device has been proposed that has a disk tray equipped with holding members that hold the optical disk loosely clamped against the outer circumference of the depression from outside the surface of the optical disk.

However, in the disk device disclosed in the above-mentioned Japanese patent application, the holding members are fixed onto the disk tray, and hence nothing can be held by the holding members except an optical disk of the prescribed diameter size, such as the 12-cm size used for ordinary CDs, etc., with the problem that when using the disk device in the vertical orientation, it is difficult to use an optical disk of a different diameter size, such as 8 cm.

SUMMARY OF THE INVENTION

It is an object of this invention to provide a disk device that can use disks of different diameter sizes and can be used in the vertical orientation.

In order to achieve the above objects, disk device according to the present invention includes circular depressions into which a disk for recording and/or playback is to be inserted and also has in its main body accommodating a disk tray on to which the disk is to be loaded. The disk tray is provided with holding members that hold said disk from outside a surface thereof and the holding members are movable in accordance with a diameter size of said disk.

Here, the holding members movable in accordance with the diameter size of the disk can be constituted so that they can move along the radial direction of a circular depression, or constructed so that they can move along a straight line through two arbitrary points on a circumference of the circular depression.

According to the present invention, since the holding members provided on the disk tray can move in accordance with the disk's diameter size, by moving the holding members, the disks of different diameter sizes can be held by the holding members even when the disk device is used in vertical orientation.

In an embodiment guide grooves are formed in the disk tray to guide the holding members along the tray surface.

For the disk tray in which guide grooves are to be formed, a highly wear-resistant material such as POM (polyoxymethylene, polyacetal) can be used.

That is, because such guide grooves are formed in the disk tray, it is possible to easily slide the holding members along the guide grooves, improving the movement operability of the holding members. By using a highly wear-resistant material as the material of the disk tray, the slidability of the holding members is improved, thus further simplifying the operation of moving the holding members.

There may be used the guide grooves which extend in the radial direction of the circular depression of the disk tray, or the guide grooves which extend in the direction of movement of the disk tray.

That is, if the guide grooves extend in the radial direction of the depression into which the disk is inserted, the holding members can be moved toward the disk's center of rotation, which makes it possible to easily adjust the position of the holding members in accordance with the disk's diameter size. If the guide grooves extend in the direction of movement of the disk tray, they will not interfere with the rack or other loading mechanism that is formed in the side opposite the disk insertion surface of the disk tray. Therefore the holding members can be moved across the tray surface without altering the structure of the disk tray's movement mechanism, and without complicating the structure of the disk device.

If an opening is formed in the disk tray into which the optical pickup unit for recording and/or reproducing a disk is inserted, the guide grooves may be formed near the end edge of that opening, and the holding members then can preferably slide along the end edge of the opening.

In case the holding members are made such that they can slide along the end edge of the opening. Therefore, they can fit into the guide grooves using the opening, and a disk tray may have slidable holding members.

Also, it is possible to have multiple such movable holding members for one disk tray. Specifically, two or more movable holding members for one disk tray may be provided.

If two or more movable holding members are provided, disks of different diameter sizes can be held by moving the holding members, without changing the position of the center of rotation, which is suitable for using the disk device in vertical orientation.

DETAILED DESCRIPTION OF THE PREFERRED EMBODIMENTS

In the following we describe, with reference to the drawings, embodiments of the present invention.

Figure 1:
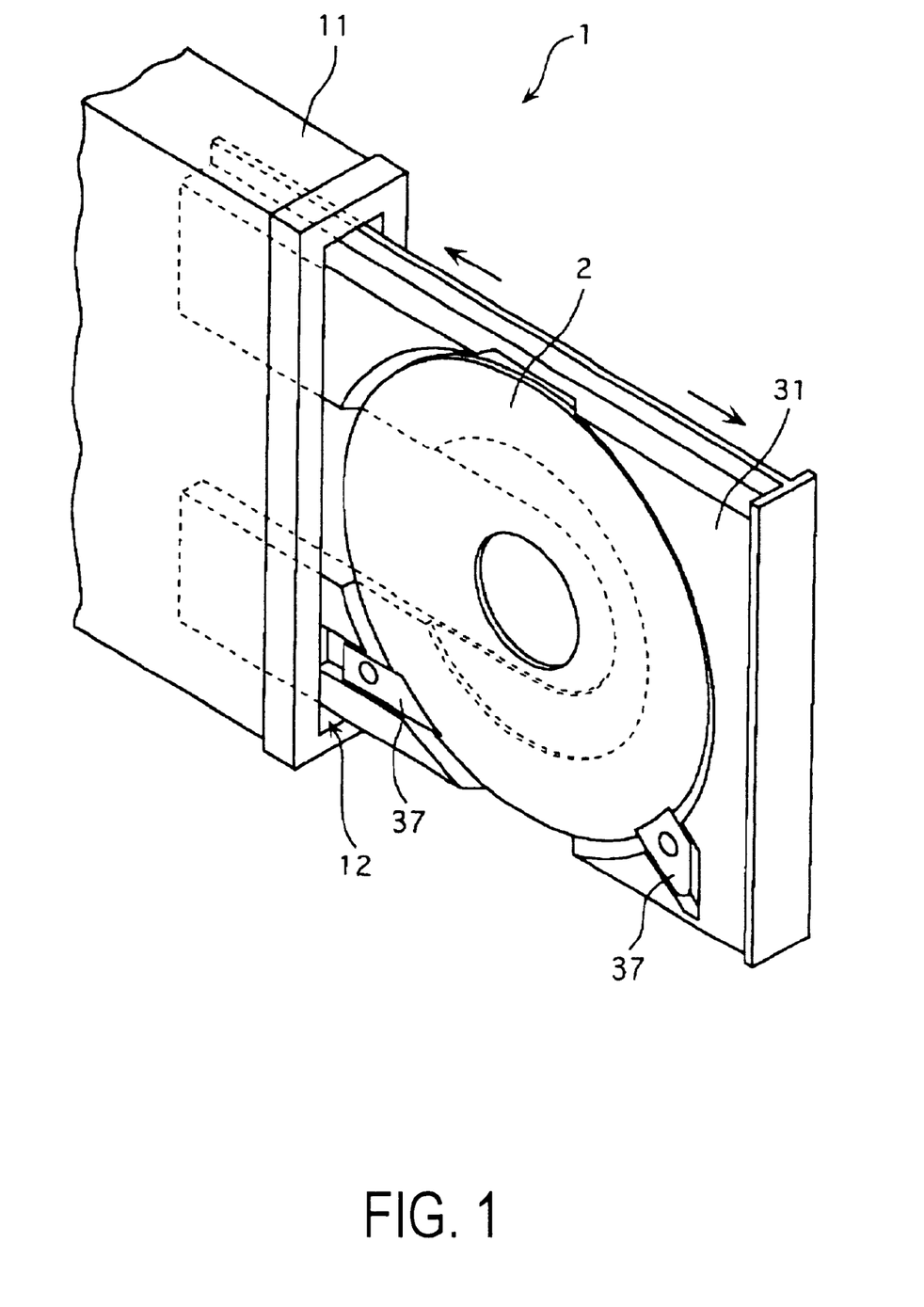
FIG. 1 is a schematic, perspective diagram of a disk device of a first embodiment of the present invention.

Shown in FIG. 1 is the disk device of the first embodiment, in which disk device 1, that plays an optical disk 2 such as a CD-ROM or DVD-ROM, has a main body 11, where an optical pickup unit (not shown in FIG. 1) is accommodated, and a disk tray 31, that loads optical disk 2 onto the main body 11.

Figure 2:
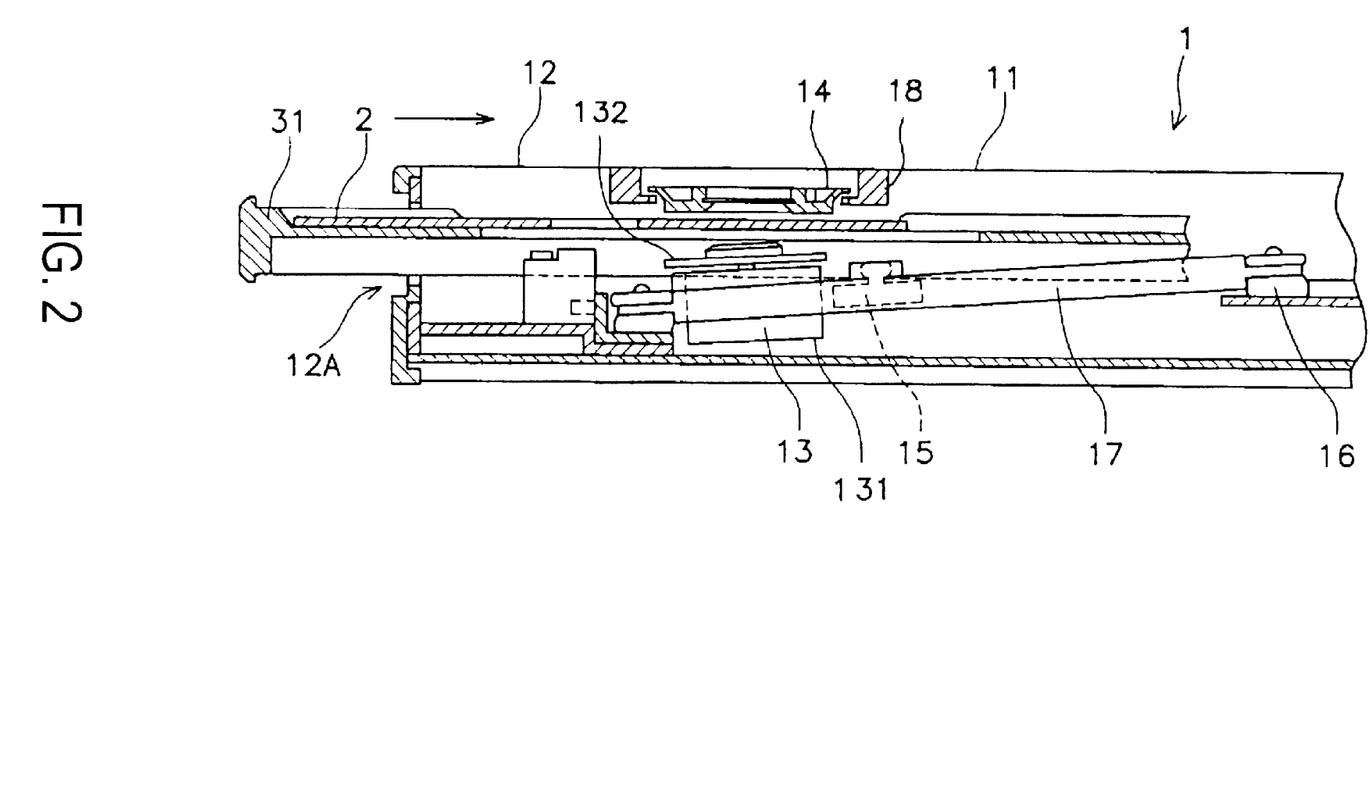
FIG. 2 is a cross-sectional view showing the internal structure of the disk device of the first embodiment.

As shown in the cross-sectional view in FIG. 2, the main body 11 has an outer case 12, in which is formed an opening 12A for receiving the disk tray 31, a spindle motor 13 and a chucking pulley 14, which cause the optical disk 2 placed on disk tray 31 to rotate, and an optical pickup unit 15, which reads the information recorded on optical disk 2.

Spindle motor 13 has a rotor case 131, in which the motor main body is housed, and a disk table 132, which supports optical disk 2, is provided on a rotation shaft that protrudes from the rotor case 131.

Spindle motor 13 and optical pickup unit 15 are positioned on a base member 17, which is rotatably supported by a rotation fulcrum 16 in the back of the main body 11 of the device. Together with the rotation of the base member 17, spindle motor 13 and optical pickup unit 15 move so as to approach toward and retreat from the disk tray 31.

Chucking pulley 14 is provided on the side opposite the position of spindle motor 13 and optical pickup unit 15 across the disk tray 31, and is held rotatably by a pulley holder 18, which is formed on the inside surface of outer case 12. Also, although not shown in FIG. 2, inside the main body 11 of the device is provided a drive mechanism for inserting in and taking out the disk tray 31 through opening 12A and causing the base member 17 to rotate about rotation fulcrum 16.

Figure 3:
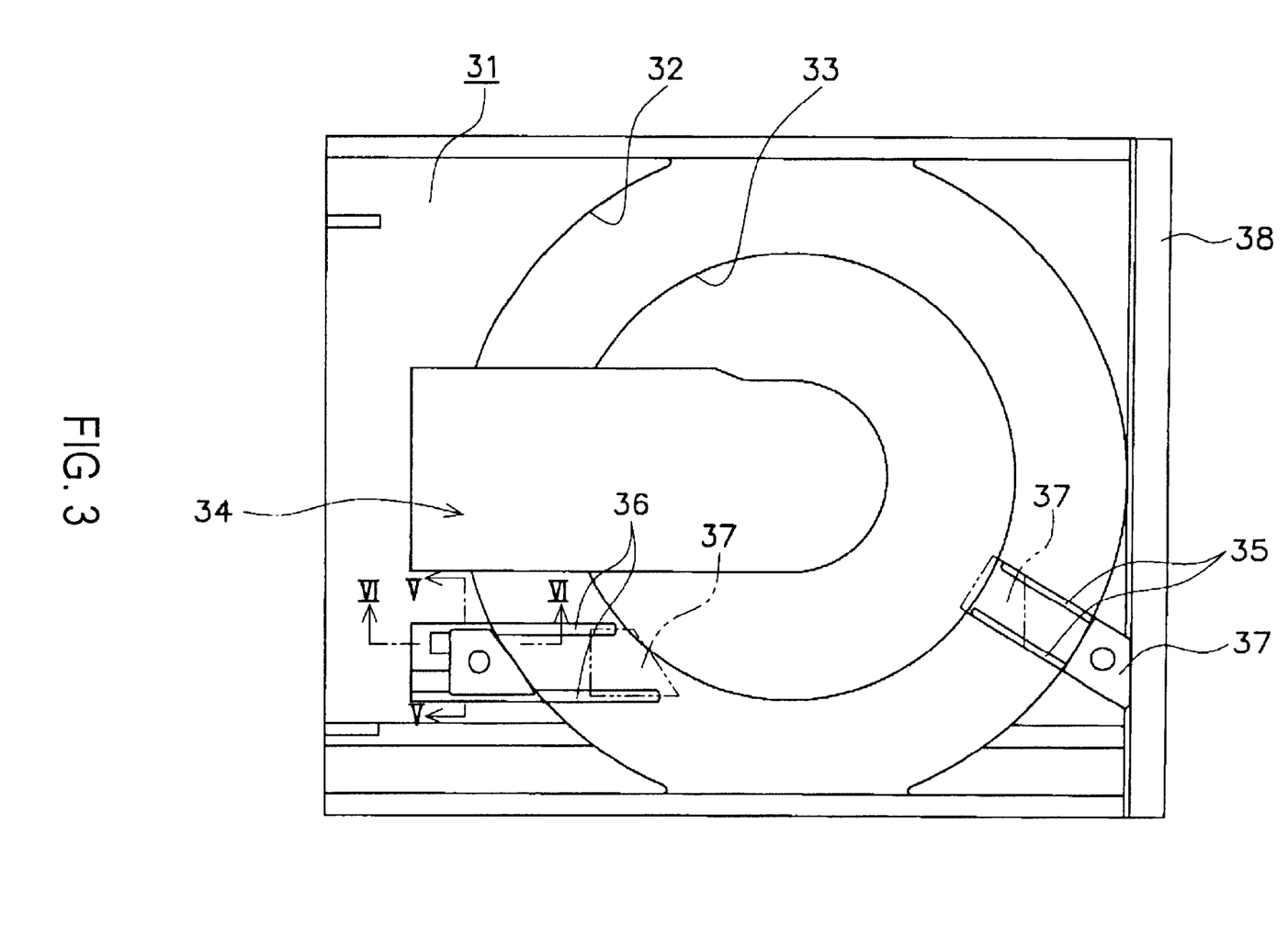
FIG. 3 is a front view of a disk tray that constitutes the disk device of the first embodiment.

As shown in FIG. 3, circular depressions 32, 33 into which disk 2 is to be inserted, are formed in the disk tray 31, of which depression 32 is for the diameter size 12 cm and depression 33 is for the diameter size 8 cm.

In approximately the center part of disk tray 31 is formed an opening 34, into which the optical pickup unit 15 is inserted when the disk tray 31 is inserted into main body 11. Such disk tray 31 is a plastic molded product for which a highly wear-resistant material such as POM is adopted.

Also formed in disk tray 31 are two guide grooves 35, which extend in the radial direction of circular depressions 32, 33, and two guide grooves 36 which are formed along a line joining two points on the circumference of depressions 32, 33 and extend along the direction in which disk tray 31 goes in and out with respect to main body 11. These guide grooves 35, 36 are in the form of slots that extend through the front and back surfaces of disk tray 31.

Attached to these guide grooves 35, 36 are holding members 37 which are free to slide along the direction in which the guide grooves 35, 36 extend. On one end edge of disk tray 31, a cover member 38 is detachably attached to disk tray 31; this cover member 38 blocks opening 12A of main body 11 when accommodated onto main body 11.

Figure 4A:
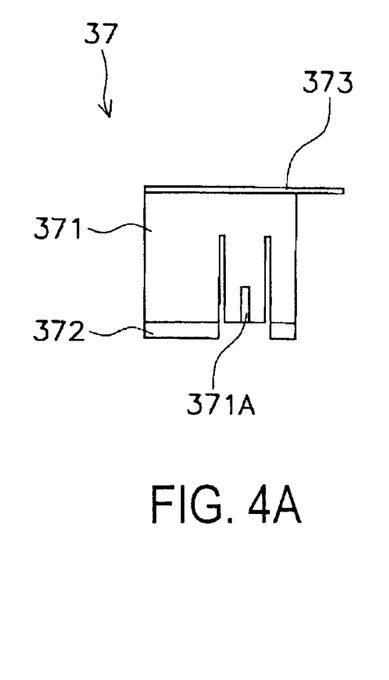
FIGS. 4A and 4B are, respectively, a front and a side view of a holding member provided on the disk tray of the disk device of the first embodiment.
Figure 4B:
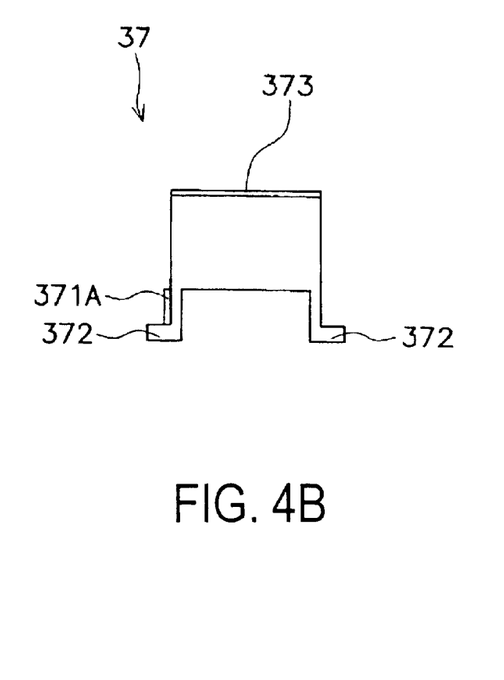

As shown in FIGS. 4A and 4B, each of holding members 37 has main body 371, multiple legs 372, which protrude from main body 371 and the base of main body 371 and are inserted into the guide grooves 35, 36, as well as a claw 373, which is screwed in place to the top surface part of main body 371 and whose end protrudes from main body 371.

As shown in the side view of FIG. 4A, between two legs 372 is formed a notch that extends to approximately the center of main body 371, and a protrusion 371A is formed on the part of main body 371 that lies between these notches.

Figure 5:
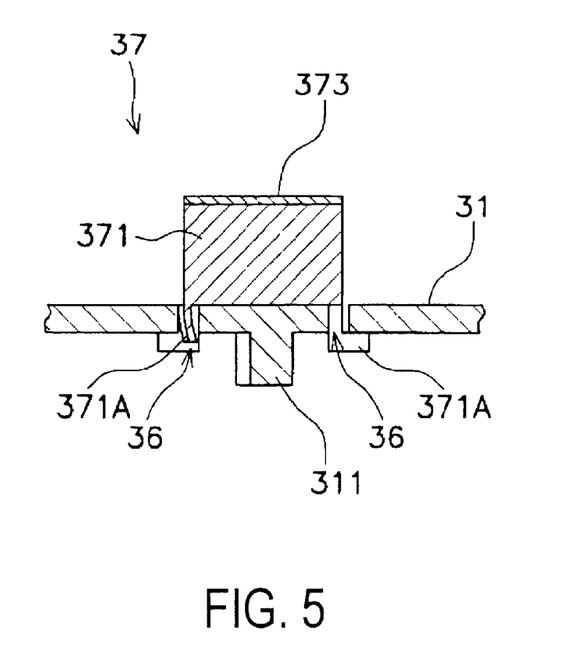
FIG. 5 is a cross-sectional view on line V—V of FIG. 3.

As shown in FIG. 5, which is a cross-sectional view on line V—V of FIG. 3, by inserting legs 372 into guide grooves 36, the holding members 37 are attached while being able to slide along guide grooves 36. And when inserting legs 372, protrusions 371A which are formed on main body 371, touch the side surface of one guide groove 36 and the notch part gets into a sagging state, and thereby holding members 37 slide on guide grooves 36 with the appropriate degree of resistance.

Also, an engagement part that engages with protrusions 371A is formed (not shown) on the part near the outer circumferential edge of depressions 32, 33, which are side surfaces of guide grooves 36 that protrusions 371A touch, thereby allowing the holding members 37 to be properly positioned in guide grooves 36 in accordance with the diameter size of optical disk 2. In the part that lies between the guide grooves 36, a rack 311 is provided on its surface of the side opposite the side on which holding members 37 are attached. The rack 311, which extends in the direction along which the disk tray 31 moves, meshes with the gear with which rack 311 constitutes the drive mechanism inside main body 11, and disk tray 31 can go out and in.

Figure 6:
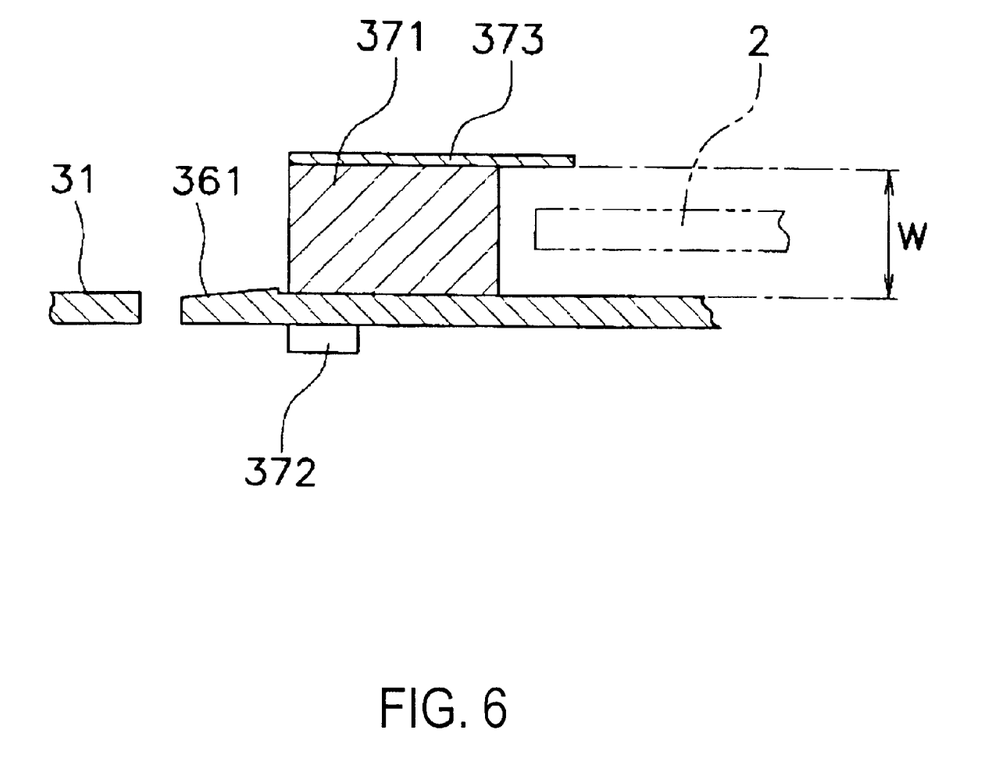
FIG. 6 is a cross-sectional view on line VI—VI of FIG. 3.

As shown in FIG. 6, which is a cross-sectional view on line VI—VI of FIG. 3, optical disk 2 is positioned and inserted between claw 373 of holding member 37 and the surface of depressions 32, 33 of disk tray 31. If disk device 1 is used oriented vertically, optical disk 2 is held on disk tray 31, with claw 373 serving as a holding means in the surface outward direction and perpendicular direction.

The distance W between the surface of disk tray 31 and claw 373 is set to be greater than the thickness of optical disk 2. This distance W is determined by the amount of ascent of disk table 132 within the main body 11; specifically, the distance W is set to have a clearance of about 2 mm with respect to the thickness of optical disk 2.

The two guide grooves 36 are connected by the base end part, and protrusion 361 is provided on the part straddled by holding members 37, as shown in FIG. 6. Holding member 37 is taken out from guide grooves 36 by pressing protrusion 361 downward and moving holding member 37 over protrusion 361.

The holding members 37 that are provided in guide grooves 35 likewise can slide along the guide grooves 35 by the same structure as above. However, guide grooves 35 extend as far as the end edge to which cover member 38 is attached, and the structure is such that holding members 37 are removed from disk tray 31 by removing cover member 38 from disk tray 31.

When disk device 1 is used oriented vertically, the holding members 37 are positioned on the bottom, and the inserted optical disk 2 is supported by these two holding members 37, as shown in FIG. 1.

Next, we explain the operation procedure if the disk device 1 is used in the vertical orientation.

(1) When the eject button (not shown) that is provided on the front panel part of main body 11 is operated, base member 17 inside the main body 11 rotates, the spindle motor 13 and optical pickup unit 15 move away from disk tray 31, and the disk tray 31 is ejected.

(2) With disk tray 31 ejected, the position of holding members 37 is adjusted in accordance with the diameter size of optical disk 2 to be inserted. Specifically, if an 8-cm-diameter optical disk 2 is to be inserted, holding members 37 provided in guide grooves 35, 36 are moved to near the outer circumference of depression 33. If, on the other hand, a 12-cm-diameter optical disk 2 is to be inserted, holding members 37 are moved to near the outer circumference of depression 32. After these operations, the desired optical disk 2 is inserted in depression 32, 33.

(3) If the eject button of main body 11 is operated again or disk tray 31 is pressed in with the prescribed force, disk tray 31 is automatically pulled in by the drive mechanism inside device main body 11, and base member 17 rotates, thereby bringing spindle motor 13 and optical pickup unit 15 near disk tray 31.

(4) With the approach of spindle motor 13, the disk table 132, which is provided on spindle motor 13, pushes up optical disk 2 inserted in depression 32, 33 and engages with the center hole of optical disk 2 and chucking pulley 14.

(5) When optical disk 2 is chucked by chucking pulley 14, optical disk 2 begins to rotate by spindle motor 13, and the information recorded on optical disk 2 is read by optical pickup unit 15.

The above-described first embodiment has the following effects.

Namely, because holding members 37 can move across disk tray 31 in accordance with the 8- or 12-cm diameter size of optical disk 2, by moving holding members 37, optical disks 2 of different diameter sizes can be held, even when disk device 1 is used oriented vertically.

Also, because guide grooves 35, 36 are formed in disk tray 31, it is easy to slide holding members 37 along guide grooves 35, 36, and the movement operability of holding members 37 is improved.

In addition, because disk tray 31 is made from a highly wear-resistant material such as POM, the slidability of holding members 37 is improved, and the movement operability is further improved.

And because guide grooves 35 extend in the radial direction of depressions 32, 33, holding members 37 can be moved toward the center of rotation of optical disk 2, and the position of holding members 37 can easily be adjusted to fit the diameter size of optical disk 2.

Since the guide grooves 36 are formed along the direction of movement of disk tray 31 with respect to main body 11, they do not interfere with rack 311, which is formed in the back surface of disk tray 31 along the direction of movement of disk tray 31. Therefore even if such guide grooves 36 are formed in disk tray 31, there is no special need to alter the structure of the movement mechanism of disk tray 31, or to complicate the structure of disk device 1.

Moreover, because multiple holding members 37 are provided that can move over disk tray 31, by adjusting the holding members 37 to fit the diameter size of disk 2, disk 2 can be held without changing the position of the center of rotation of disk 2, which is favorable for using disk device 1 in vertical orientation.

Next, we describe a second embodiment of this invention. In the following description, for those parts that are the same as the parts or members that have already been described, the same reference numerals are used to simplify or omit the description of those parts.

In disk device 1 of the first embodiment, holding members 37 are provided on disk tray 31 at only two places.

Figure 7:
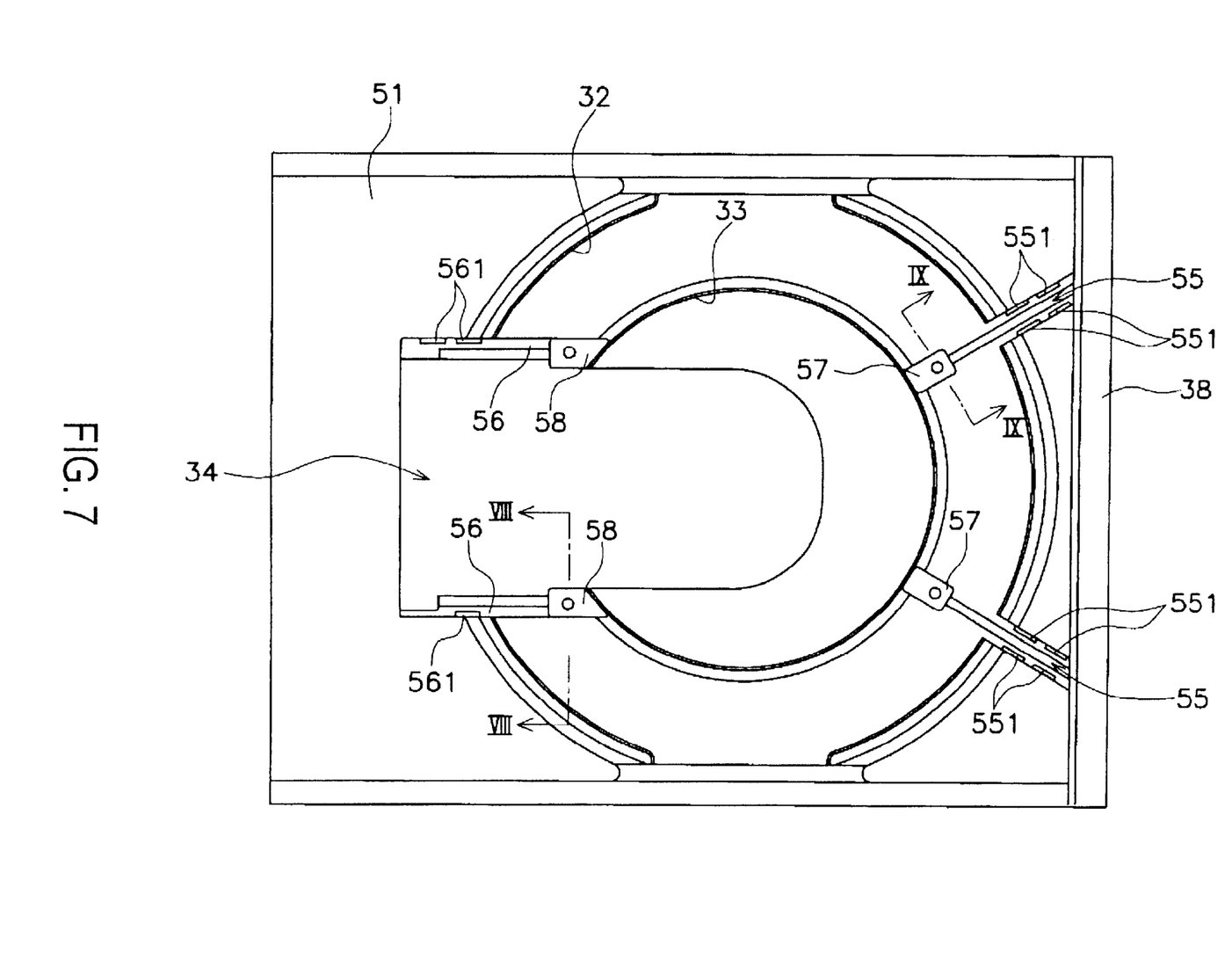
FIG. 7 is a front view of a disk tray that constitutes the disk device of a second embodiment of this invention.

What is different here is that holding members 57, 58 are provided at four places on a disk tray 51 formed of the disk device of the second embodiment, in such a way as to surround depressions 32, 33, as shown in FIG. 7.

Also, in device 1 of the first embodiment, two guide grooves extending in the direction of movement of disk tray 31 are of slot shapes in disk tray 31 and are positioned so as to sandwich the rack 311 on the back surface there.

What is different in the second embodiment is that in disk tray 51 guide grooves 56 are formed along the end edge of opening 34 through which the optical pickup unit is inserted to inside the main body.

Figure 8:
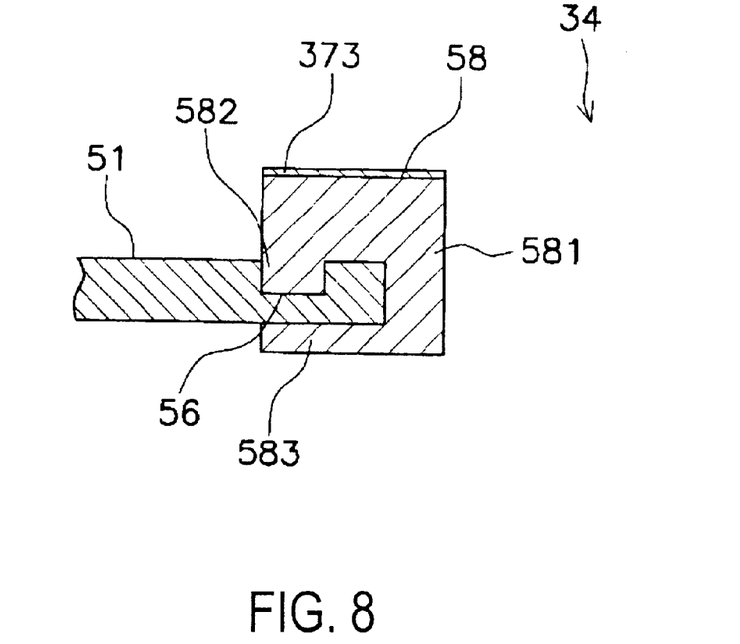
FIG. 8 is a cross-sectional view on line VIII—VIII of FIG. 7.

That is, as shown in FIG. 8, which is a cross-sectional view on line VIII—VIII of FIG. 7, guide grooves 56 are formed along the end edge of opening 34 for the optical pickup unit of disk tray 51.

Holding members 58 have a main body 581 and legs 582, 583, and the end of one leg 582 fits into guide groove 56, while the inside side surface of the other leg 583 touches the end edge of opening 34. The end of leg 583 extends along the back surface of disk tray 51, and holding members 58 are attached by legs 582, 583 so as to pinch disk tray 51. Also, as shown in FIG. 7, in guide grooves 56, engagement grooves 561 are formed near the outer circumference of depressions 32, 33 for disk insertion, these engagement grooves 561 engage with protrusions, not shown, formed on the bottom surface of legs 582, and holding members 58 can be positioned to fit the diameter size of the optical disk.

Figure 9:
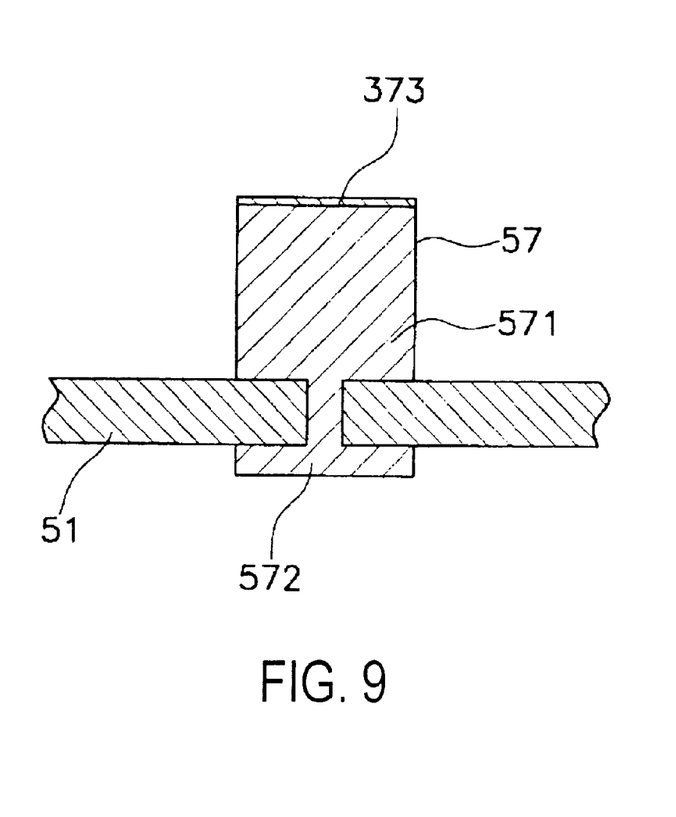
FIG. 9 is a cross-sectional view on line IX—IX of FIG. 7.

On the other hand, guide groove 55 consists of a single groove that extends toward the center of the circle of depressions 32, 33. As shown in FIG. 9, which is a cross-sectional view on line IX—IX in FIG. 7, holding member 57 has a main body 571 and one leg 572. Leg 572 is insertion-fitted into guide groove 55 and is held so as to be able to freely slide along guide groove 55. Although not shown in FIG. 9, a protrusion is formed on the bottom surface of main body 571, and holding member 57 can be positioned by causing this protrusion to engage with engagement groove 551 (see FIG. 7) formed near the outer circumference of depressions 32, 33.

A description of the other parts and of the operation, etc. of the disk device is omitted, because they are the same as in the aforesaid first embodiment.

The second embodiment has the following effects, in addition to those listed above for the first embodiment.

Namely, because movable holding members 57, 58 are provided at four places on disk tray 51, the disk device can be used in vertical orientation without the need to consider the orientation of disk tray 51, thereby further improving the generality of the disk device. It is to be noted that at least three holding members are needed in order to hold a circular optical disk 9 in disk tray 51 and make it possible to reverse the vertical orientation of the disk device.

Also, because holding members 58 are provided slidably along the end edge of opening 34, holding members 58 can be simply press-fitted into the guide grooves using opening 34, and the disk tray 51 having slidable holding members 58 is simple to manufacture.

Moreover, the present invention is not limited to the described embodiments; it also includes modifications such as the following.

In the above described embodiments, disk device 1 is a disk-playback-only device that exclusively plays optical disks 2, but the device is not limited thereto. That is, the disk device can be such that it can play optical disks and/or record onto optical disks, and even if the present invention is adopted for such a disk device, the same effects can be obtained as those listed for the above embodiments.

Also, in the above embodiments, disk device 1 is of the type that reads information that is recorded on optical disk 2 by optical pick up unit 15, but it is not limited to this; this invention can also be adopted for disk devices that are based on other recording and playback methods. In other words, the present invention can be adopted as long as it is a disk device that has a structure in which a disk is loaded by holding the disk in the disk tray.

In addition, the specific structure and shape, etc. when implementing this invention may have other structures, etc. within the range that allows the purpose of this invention to be achieved.

With the disk device of the present invention as described above, because holding members provided on the disk tray can move to fit the diameter of the disk, by moving the holding members, disks of different diameter sizes can be held by the holding members even when the disk device is used in vertical orientation.

What is claimed is:

1. A disk device comprising:
   a disk tray which has at least two circular depressions defined by a first depression being sized to accommodate a disk having a first diameter and at least one second depression being sized to accommodate another disk having a second diameter; and
   holding members provided on said disk tray, which hold a disk along an outer surface thereof,
   wherein said holding members are movable in accordance with the diameter size of a disk inserted into said disk tray such that each of a disk having a first diameter and seated within said first depression, or a disk having a second diameter and seated within said at least one second depression, is holdable by said holding members.

2. A disk device according to claim 1, wherein guide grooves that guide said holding members along a surface of said disk tray are formed in said disk tray.

3. A disk device according to claim 2, wherein said guide grooves extend in a direction of a radius of said circular depressions.

4. A disk device according to claim 3, wherein an opening is formed in said disk tray which receives an optical pickup unit for recording on said disk and/or playing said disk, and wherein said guide grooves are formed near an end edge of said opening, and said holding members are slidable along the end edge of said opening.

5. A disk device according to claim 2, wherein said guide grooves extend in a direction of sliding movement of said disk tray.

6. A disk device according to claim 1, further comprising a plurality of holding members.

7. A disk device that loads and drives an optical disk, comprising:
   a disk tray slidably positioned in said disk device and receiving an optical disk loaded there into; and
   at least two holding members arranged on said disk tray, wherein
   said disk tray has guide grooves formed therein, and
   said holding members slidably engage with said grooves and can be held in an arbitrary position, thereby making it possible for said holding members to hold optical disks of different diameter sizes.

8. A disk device according to claim 7, wherein said guide grooves extend in a direction that has a component of a radial direction of the optical disk that is loaded into said disk tray.

9. A disk device according to claim 7, wherein said holding members have legs that engage with said guide grooves and claws that extend parallel to a surface of said disk tray and surround an end of said optical disk.

10. A disk device according to claim 7, comprising at least three said holding members.

11. A disk device that loads and drives an optical disk, comprising
    a disk tray slidably positioned in said disk device and receiving an optical disk loaded thereinto, and
    at least two holding members arranged on said disk tray, wherein
    said holding members slidably engage with said disk tray and are arbitrarily positionable relative to said disk tray to hold optical disks of different diameter sizes.

12. A disk device according to claim 11, further comprising guide grooves provided in said disk tray in which said holding members are slidable.

13. A disk device according to claim 12, wherein said disk tray further comprises at least one circular depression and said guide grooves extend in a direction of a radius of said at least one circular depression.

14. A disk device according to claim 12, wherein said guide grooves extend in a direction of sliding movement of said disk tray.

15. A disk device according to claim 12, wherein an opening is formed in said disk tray which receives an optical pickup unit, and wherein said guide grooves are formed near an end edge of said opening, and said holding members are slidable along the end edge of said opening.

16. A disk device in accordance with claim 11, wherein said different diameter sites further comprise a 12 cm diameter size and at least one other diameter size.

17. A disk device in accordance with claim 11, wherein said different diameter sizes further comprise one of an 8 cm diameter and a 12 cm diameter.

18. A disk device in accordance with claim 11, wherein said holding members are movable from a first position for holding a disk having a first diameter, to a second position for holding a disk having a second diameter.

* * * * *